US007850388B2

(12) United States Patent
Khoshnevis

(10) Patent No.: US 7,850,388 B2
(45) Date of Patent: Dec. 14, 2010

(54) COMPLIANT, LOW PROFILE, INDEPENDENTLY RELEASING, NON-PROTRUDING AND GENDERLESS DOCKING SYSTEM FOR ROBOTIC MODULES

(75) Inventor: Behrokh Khoshnevis, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 169 days.

(21) Appl. No.: 11/733,096

(22) Filed: Apr. 9, 2007

(65) Prior Publication Data

US 2007/0286674 A1 Dec. 13, 2007

Related U.S. Application Data

(60) Provisional application No. 60/744,483, filed on Apr. 7, 2006.

(51) Int. Cl.
*F16B 21/02* (2006.01)
(52) U.S. Cl. .................. 403/323; 403/322.1; 244/172.4
(58) Field of Classification Search .............. 244/172.4, 244/172.5, 131; 901/28, 29; 403/348, 321, 403/322.1, 323, DIG. 12, DIG. 13; 464/166
See application file for complete search history.

(56) References Cited

U.S. PATENT DOCUMENTS 3,666,216 A * 5/1972 Nagy et al. .............. 244/172.4
4,607,815 A * 8/1986 Turci et al. ............... 244/172.4
4,929,009 A * 5/1990 Vandersluis et al. ...... 244/172.5
5,429,328 A * 7/1995 Dobbs et al. ............. 244/172.5
6,935,805 B2 * 8/2005 O'Brien et al. .......... 403/322.1

OTHER PUBLICATIONS

Khoshnevis, B.P. et al. Highly Compliant and Self Tightening Docking Modules for Precise and Fast Connection of Self-Reconfigurable Robots. Proceedings of 2003 IEEE Conference on Robotics and Automation, Taipei, May 2003. 6 pages.

* cited by examiner

*Primary Examiner*—Michael P Ferguson
(74) *Attorney, Agent, or Firm*—McDermott Will & Emery LLP

(57) ABSTRACT

An apparatus for coupling with a mating coupling module to facilitate the joining of two disjoined structures without requiring precise alignment between the disjoined structures during the coupling of them may include a rotating drive mechanism, a hollow cylindrical body operatively connected to the rotating drive mechanism, wherein the hollow cylindrical body has at least one internal spiral channel, and at least one connector claw positioned within the hollow cylindrical body and guided by the internal spiral channel, wherein the at least one connector claw is configured to extend outwardly from the coupling module to engage the mating coupling module when brought in close proximity but not necessarily in precise alignment with the mating coupling module.

17 Claims, 7 Drawing Sheets

COMPLIANT, LOW PROFILE, INDEPENDENTLY RELEASING, NON-PROTRUDING AND GENDERLESS DOCKING SYSTEM FOR ROBOTIC MODULES

CROSS-REFERENCE TO RELATED APPLICATION

This application claims priority under 35 U.S.C. §119(e) from co-pending, commonly owned U.S. provisional patent application, Ser. No. 60/744,483, filed on Apr. 7, 2006, entitled "Compliant, Low Profile, Non-Protruding, and Genderless Docking System for Robotic Modules." The entire content of this provisional application is incorporated herein by reference.

STATEMENT REGARDING FEDERALLY SPONSORED RESEARCH

This invention was made with government support under Contract No. NNA05CS38A, awarded by the National Aeronautics and Space Administration-Ames Research Center (NASA-AMES). The government has certain rights in the invention.

BACKGROUND

Docking between multiple disjointed structures can be a problem that occurs in engineering systems that must dynamically change their structures for various purposes. Human-operated docking is widely seen in daily life, and can be as simple as changing a blade in a razor or as complex as docking one spacecraft to another.

Autonomous docking, however, may have the ability to enable all reconfigurable actions, and may be able to perform frequent docking/undocking routines and in different system configurations and structures. Further, autonomous docking may need to foolproof and support all of the interconnection needs of the system—from structural load bearing to communications and power sharing.

Among applications of autonomous docking, one that may benefit from autonomous docking may be the self-reconfigurable or metamorphic robot. Such robots may be made of many autonomous coupling modules that self-rearrange their connections to change the robot's morphology (e.g., shape and size) in order to meet environmental and other demands of a given task. Such robots may be useful in applications that benefit from or require the use of robots with different topologies. A metamorphic robot could be a "crab" to climb over rubble and then smoothly morph to a "snake" to slither down between the stones to locate a person or some artifact. It may become a ball to roll down a hill, or transform a leg into a gripper to perform a grasping operation. Coupling modules are usually interconnected to make a chain or tree of modules, but rings and lattices are supported also. The task of autonomous docking in these robots may be intricate and challenging. A reliable solution might be applied to almost any docking domain.

Indeed, autonomous docking is a long-standing and challenging problem for self-reconfigurable robots. The challenge lies in the fact that autonomous docking may be the only ability that enables all reconfigurable actions, and may need to be performed frequently and in different system configurations. Docking may need to be foolproof and support all of the interconnection needs of the system—from structural load bearing to communications and power sharing. Such docking systems may involve positioning the various modules correctly, then making a connection that must support as many modalities as needed in a particular application, and work in many, sometimes wet, dirty, and hostile environments. The problem of interconnection and interfacing may get much worse as the number of modalities involved increases. Furthermore, the components may need to make and break both multi-modal electrical and mechanical connections, in spite of being repeatedly connected and disconnected.

Autonomous docking may be critical to the success of metamorphic robots. Without a reliable solution to the problem, the true advantages of metamorphic robots may not be delivered to real-world applications and may remain a mathematical exercise exciting only scientific curiosity. After nearly ten years of research by the international community, autonomous docking is commonly believed to be among the most challenging problems in self-reconfigurable robots.

Accordingly, there is a need for systems and methods that can couple two disjointed structures and, additionally, eliminating the need for human-operation.

SUMMARY

One aspect of an apparatus for coupling with a mating coupling module is disclosed. The apparatus for coupling with a mating coupling module to facilitate the joining of two disjoined structures without requiring precise alignment between the disjoined structures during the coupling of them may include a rotating drive mechanism, a hollow cylindrical body operatively connected to the rotating drive mechanism, wherein the hollow cylindrical body has at least one internal spiral channel, and at least one connector claw positioned within the hollow cylindrical body and guided by the internal spiral channel, wherein the at least one connector claw is configured to extend outwardly from the coupling module to engage the mating coupling module when brought in close proximity but not necessarily in precise alignment with the mating coupling module.

Another aspect of an apparatus for coupling with a mating coupling module is disclosed. The apparatus for coupling to a mating coupling module to facilitate the joining of two disjoined structures without requiring precise alignment between the disjoined structures during the coupling of them may include a rotating drive mechanism, and a first connector claw operatively connected to the rotating drive mechanism, wherein the first connector claw outwardly extends so as to allow the first connector claw to engage a second connector claw of the mating coupling module and draw the coupling module together with the mating coupling module.

One aspect of a method of coupling two disjointed structures is also disclosed. The method of coupling two disjointed structures without requiring precise alignment between the two disjointed structures during the coupling of them may include rotating a first connector claw operatively connected with a first disjoined structure, extending the first connector claw outwardly toward a second connector claw, wherein the second connector claw is operatively connected to a second disjoined structure, moving the first and second connector claws to a close proximity between each other but not necessarily in precise alignment, and engaging the first connector claw with the second connector claw so as to draw the second disjoined structure together with the first disjoined structure.

BRIEF DESCRIPTION OF THE DRAWINGS

Aspects of the present invention are illustrated by way of example, and not by way of limitation, in the accompanying drawings wherein.

DETAILED DESCRIPTION

The detailed description set forth below in connection with the appended drawings are intended as a description of various embodiments and is not indeed to represent the only embodiment in which it may be practiced. The detailed description includes specific details for the purpose of providing a thorough understanding, however, it will be apparent to those skilled in the art that what is disclosed may be practiced without these specific details. In some instances, well-known structures and components are shown in basic diagram form in order to avoid obscuring the concepts.

The various concepts described throughout this disclosure may be applied to any group of coupling modules. The coupling modules may be attached to any robot or other suitable disjointed structure. In the following detailed description, these concepts will be described in the context of a coupling module and a mating coupling module configured to independently engage or disengage with each other to comprise a fully autonomous docking system. The autonomous docking system may include several unique features, including high compliance, low profile, independent docking and undocking ability, being non-protruding, and allows genderless interconnection. High compliance may be accomplished since the coupling module and mating coupling module may be able to dock under relatively high positioning errors in omni-directions. Further, due to the coupling module design of having minimal distance between top and base portions, the several coupling module units may be installed on multiple faces of a robot module (or any other docking surface) without seriously enlarging the overall robot volume. This low profile may be especially important when docking has to be performed in tight regions where there is not much space for maneuverability.

The independent docking and undocking feature may be capable of being carried out by each coupling module so as to disengage with the coupling mating module even if the mating module malfunctions. Also, when the coupling module is placed in non-operational or passive mode, there may be no protrusions from its surface, therefore, it may not limit the motion of the robot on which it is installed. And unlike most docking pairs, the coupling module may not have fixed male and female configurations. A pair of coupling and mating coupling modules may be identical, however, upon docking one of the modules protrudes its rotating claws and enters the mating module.

Figure 1:
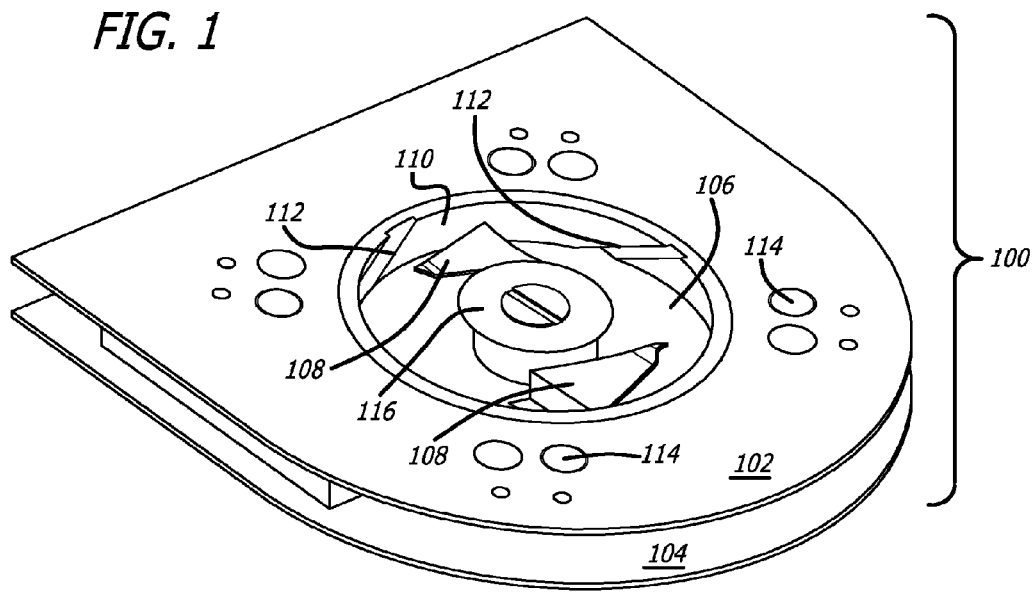
FIG. 1 is a perspective illustration of an embodiment of a coupling module in a retracted position.

FIG. 1 is a perspective illustration of an embodiment of a coupling module 100 in a retracted position. In the initial state, the connector plate 106 having connector claws 108 may be fully recessed or retracted within a hollow cylindrical body 110. The hollow cylindrical body may have one or more internal spiral channels 112 which may assist in guiding the connector plate 106 up the hollow cylindrical body 110 once the coupling module 100 attempts to engage a mating coupling module (not shown).

Further, the coupling module 100 may have a top portion 102 which exposes at least connector claws 108 to enable engaging with a mating docking module when the connector claws 108 are extracted or protruded. The top portion 102 may be connected to a base portion 104. The base portion 104 may have a fixed main shaft substantially center to the base portion 104 in order to provide focal center whereupon all rotating components revolve. A center shaft sleeve 116 may be connected to the fixed main shaft of the base portion 104. The connector plate 106 may rotate in unison with the center shaft sleeve 116 but only until the connector plate 106 reaches the maximum extending range. Once the connector plate 106 reaches the maximum extending range, the connector plate 106 may abut a top flange of the center shaft sleeve 116. Also, the center shaft sleeve 116 may have a vertical external channel and may guide the connector plate 106 from within the connector plate's 106 center ring.

Figure 2:
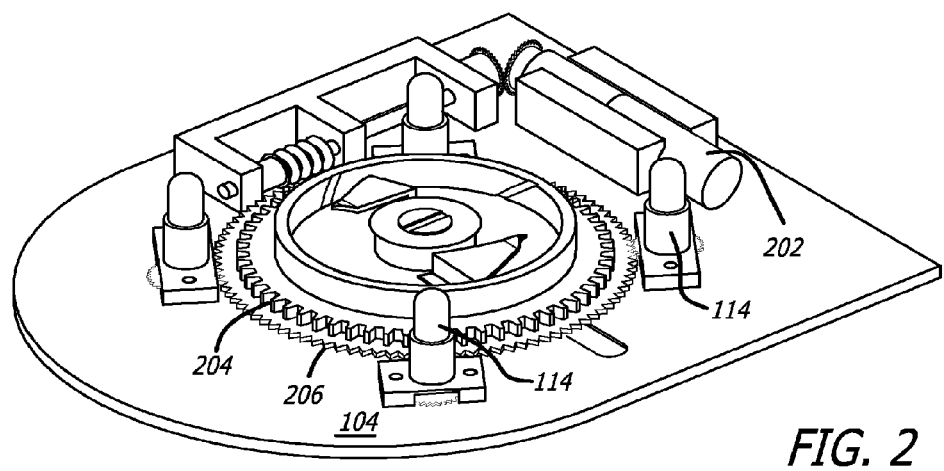
FIG. 2 is a perspective illustration of a coupling module in a retracted position with the top portion removed, thereby exposing the internal components of the coupling module.

FIG. 2 is a perspective illustration of a coupling module 100 in a retracted position with the top portion 102 removed, thereby exposing the internal components of the coupling module 100. The driving mechanism 202 may be configured to rotate a primary gear 204. The driving mechanism may be a motor or any device that may provide forward and reverse rotational movement to the primary gear 204. In this illustrative embodiment, the driving mechanism 202 transfers its rotating force to the primary gear 204 through a series of beveled gears and a warm gear. However, one of ordinary skill in the art can appreciate that the driving mechanism 202 could just as readily be oriented so as to not require the use of any gear or oriented so as to require the use of different gears. For example, the use of an additional shaft, which is in perpendicular position to the driving mechanism 202 axis, is merely to create a compact design. Otherwise, the driving mechanism 202 may directly drive a worm gear without the need for additional bevel gears.

The primary gear 204 may be connected to the hollow cylindrical body 110. Thus, as the primary gear 204 rotates, the hollow cylindrical body 110 may rotate in unison with the primary gear 204. The pin drive gear 206 may be connected with the hollow cylindrical body 110 by detent mechanism. A detent mechanism, as used herein, is a mechanical arrangement used to hold a moving part in a temporarily fixed position relative to another part, i.e., one part rotates within the other. Here, the pin drive gear 206 may rotate about the main shaft to drive the guide or guiding pins 114 vertically perpendicular to the connector plate 106. Once the guiding pins 114 are fully extended, the detents along the inner circumference of the pin drive gear 206 release, thus, the pin drive gear may remain stationary while the hollow cylindrical body 110 continues to rotate.

Figure 3:
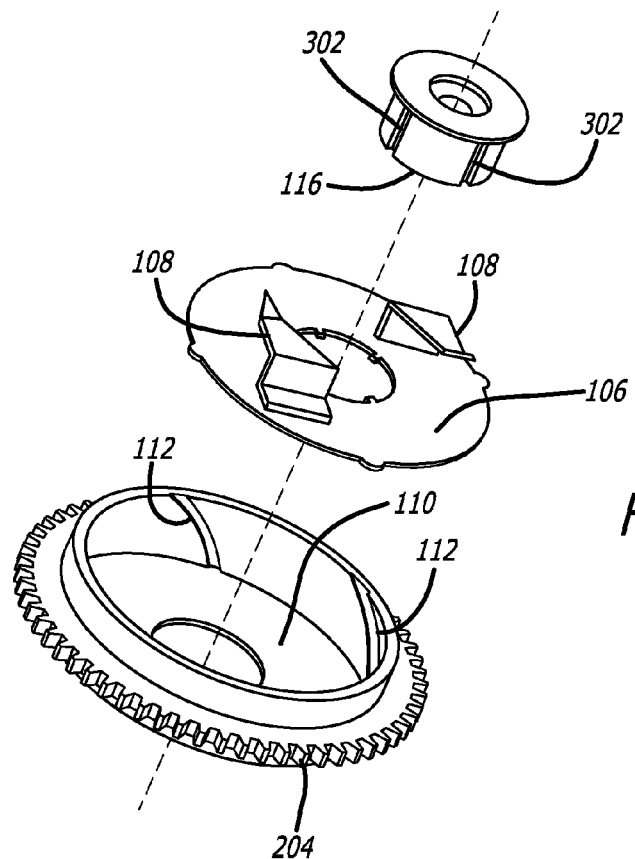
FIG. 3 is a perspective illustration of the layered components that rotate about a main shaft.

FIG. 3 is a perspective illustration of the layered components that rotate about a main shaft. The connector plate 106 may have one or more connector claws 108 positioned so as to have the connector plate's 106 external circumference guided by the internal spiral channels 112 of the hollow cylindrical body 110. The connector plate's 106 internal circumference may be guided by the one or more vertical external channels 302 of the center shaft sleeve 116. The internal spiral channels 112 of the hollow cylindrical body 110 may push the connector claws 108 and connector plate 106 forward, while the substantially vertical channels of the center shaft sleeve 116 may prevent the connector plate 106 from turning with the hollow cylindrical body 110.

Figure 4:
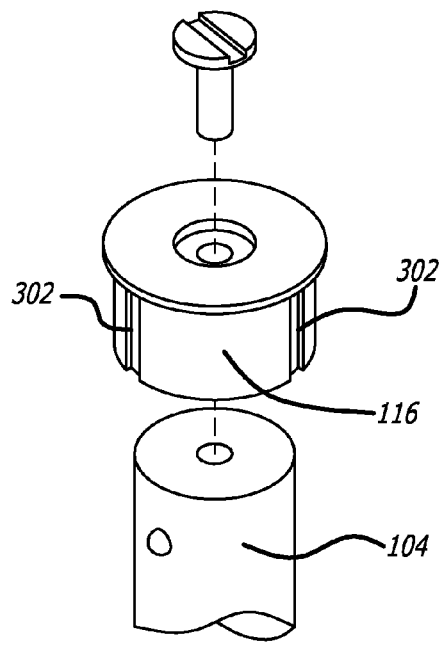
FIG. 4 is a perspective illustration of a center shaft sleeve as it relates to a base portion having a fixed main shaft.

FIG. 4 is a perspective illustration of a center shaft sleeve 116 as it relates to a base portion 104 having a fixed main shaft. The center shaft sleeve 116 may be connected by rivet, pin, nail, bolt, or any other type of fastener that would freely enable the rotational movement of the connector plate 106. The base portion 104 having a fixed main shaft may use a detent mechanism so as to prevent the center shaft sleeve 116 from rotating while the connector plate 106 rises up the hollow cylindrical body 110. However, once the connector plate 106 reaches the top flange of the center shaft sleeve 116, and thereby attaining the maximum extending range of the connector claws 108, the center shaft sleeve 116, the connector plate 106, the hollow cylindrical body 110, and the primary gear may all rotate in unison to engage a coupling mating module.

Figure 5:
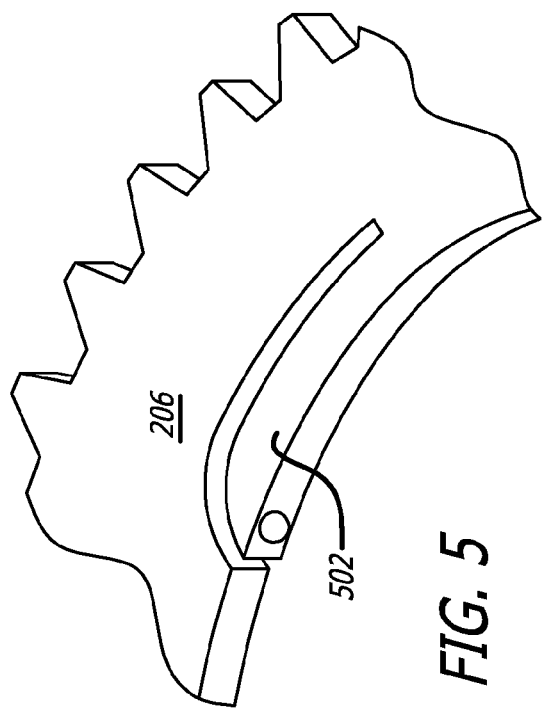
FIG. 5 is a perspective illustration of a pin drive gear.

FIG. 5 is a perspective illustration of a pin drive gear 206. The pin drive gear 206 may be connected to the hollow cylindrical body 110 by means of the detents 502 that engage depressions around the outer surface of the hollow cylindrical body 110. The detent mechanism 502 may be configured to release once the guiding pins 114 are fully extended.

Figure 6:
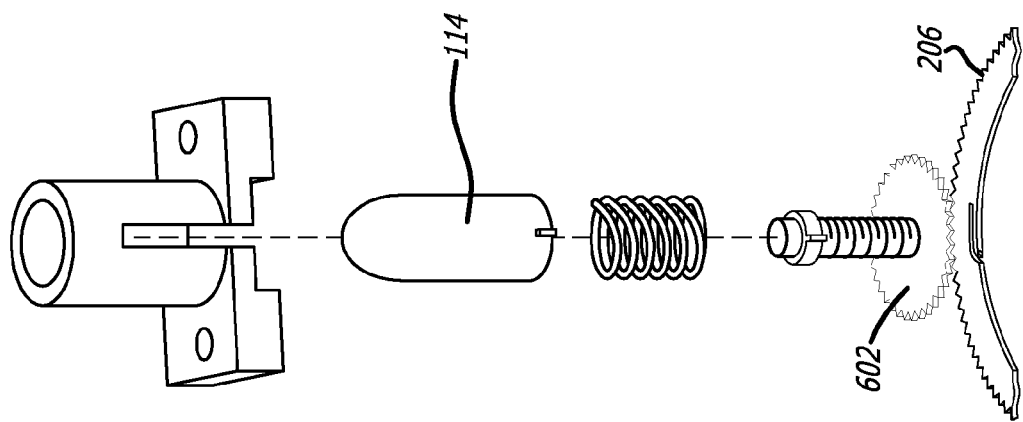
FIG. 6 is a perspective illustration of a guiding pin mechanism.

FIG. 6 is a perspective illustration of a guiding pin 114 mechanism. As the primary gear 204 may be rotated by the driving mechanism 202, the primary gear 204 may rotate the hollow cylindrical body 110, which in turn may rotate the pin drive gear 206. As the pin drive gear 206 rotates, all pin screw gears 602 may rotate. The pin screw gears 602 may raise the guiding pin 114 by spring mechanism. The spring mechanism may prevent the guiding pin 114 from jamming the pin drive gear 206 and may allow the guiding pin 114 to be forced flush to the top portion 102 if the guiding pin 114 meets external resistance. The guiding pin 114 may have a point that is substantially spherical to facilitate insertion into a coupling mating module's receiving guiding pin cavity.

Figure 7:
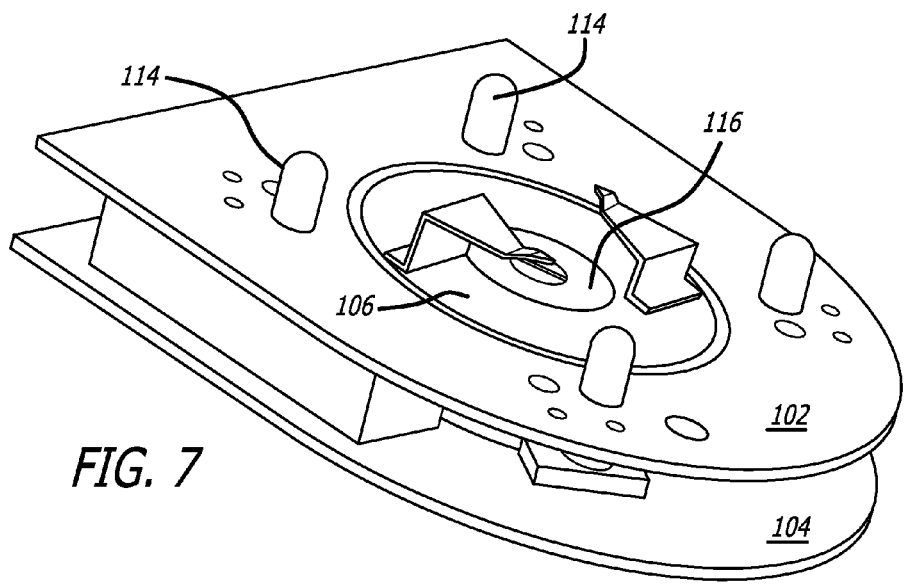
FIG. 7 is a perspective illustration of an embodiment of a coupling module in an extended position.

FIG. 7 is a perspective illustration of an embodiment of a coupling module in an extended position. Once the drive mechanism 202 has caused the connector plate 106 to reach its maximum extending range, the connector plate 106 may be substantially flush with the plane of the top portion 102. The center shaft sleeve's 116 flange may prevent the connector plate 106 from extending any further. At this point the turning force of the driving mechanism 202 may be transferred to the center shaft sleeve 116 through the connector plate 106. This force may defeat the stopping force of the spring loaded balls of the main shaft and hence, the shaft sleeve 116, the connector plate 106, and the hollow cylindrical body 110 may turn in unison. At the fully extended position, the guiding posts 114 may also be fully extended.

Figure 8:
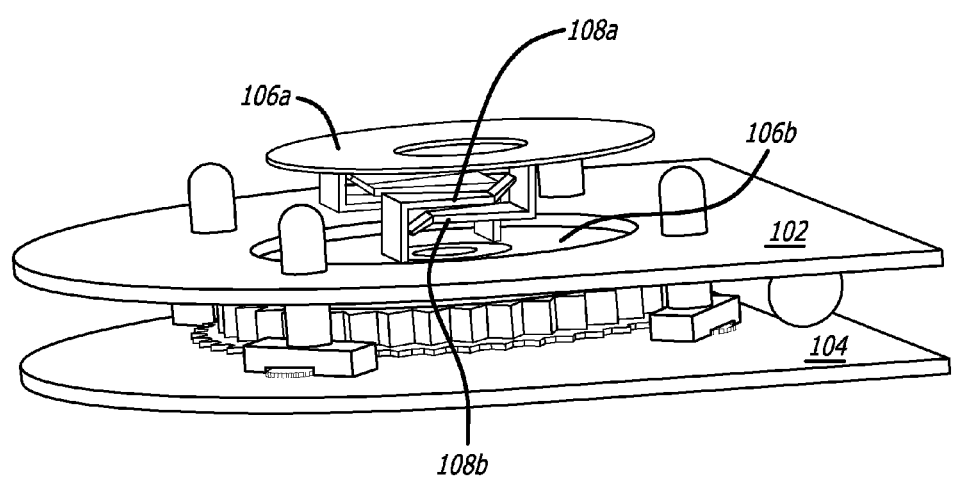
FIG. 8 is a perspective illustration of an embodiment of a coupling module in an extended position and engaged with the connector claws of a mating coupling module.

FIG. 8 is a perspective illustration of an embodiment of a coupling module 100 in an extended position and engaged with the connector claws 108 of a mating coupling module. A connector plate 106b, after having been fully extended, may engage the connector plate 106a of a mating coupling module. As the protruded connector claws 108 of the connector plate 106 rotate and enter the hollow cylindrical body 110 of the coupling mating module (not shown), the two claws sets 108a and 108b may interlock and docking may be completed. Increased motor current may signal the end of motion range. Reverse action of the driving mechanism 202 may unlock the connector plate 106 and retract it inward into the hollow cylindrical body 110. The retracting step may also retract the guiding pins 114 by reversing the pin drive gear 206.

Figure 9:
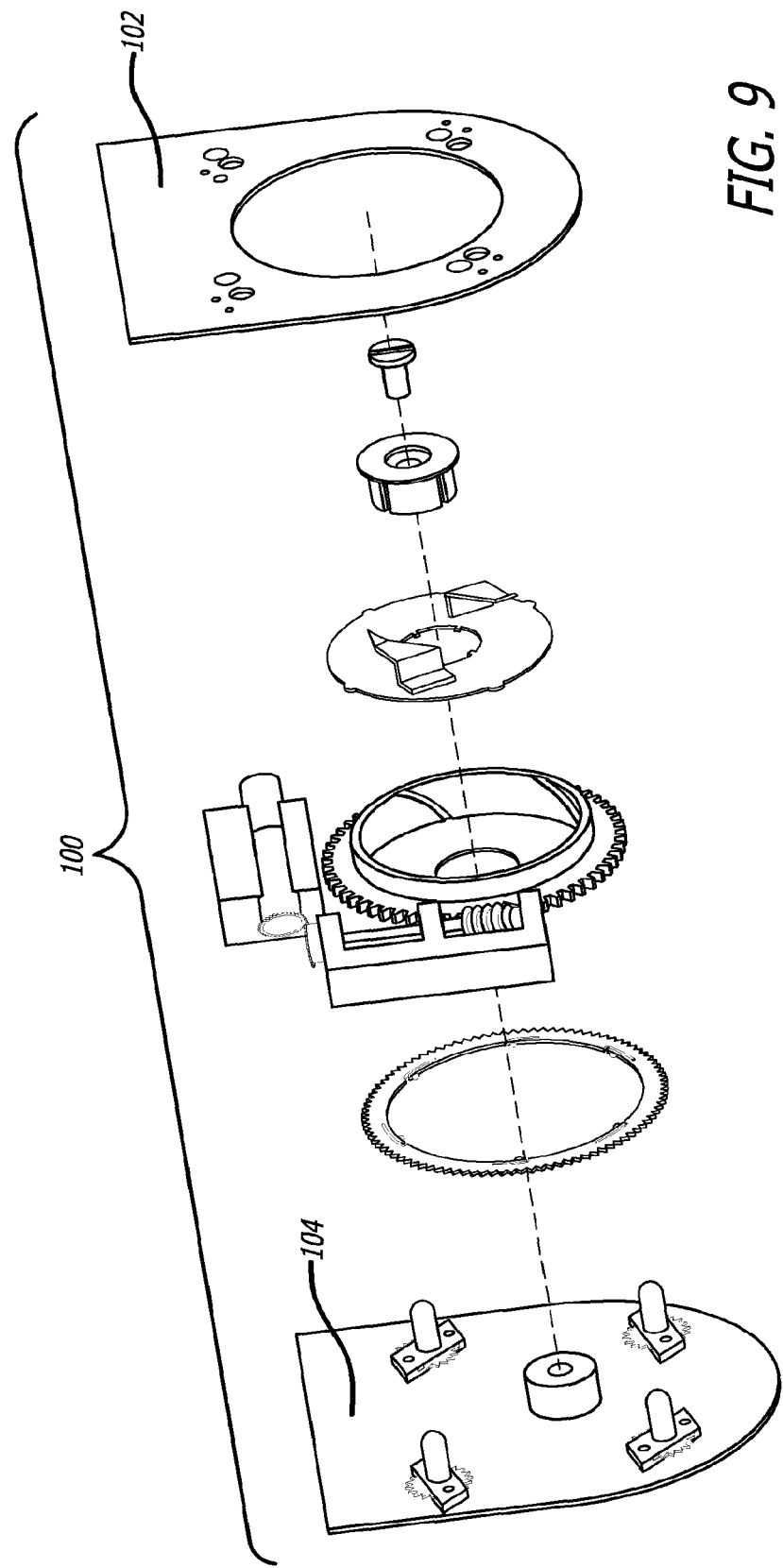
FIG. 9 is a perspective illustration of the layered components that together comprise a coupling module.

FIG. 9 is a perspective illustration of the layered components that together comprise a coupling module. One of ordinary skill in the art may appreciate that the layered components may be interchanged and/or substituted with different components achieving the substantially equal result without deviating from the teachings of this disclosure.

Figure 10A:
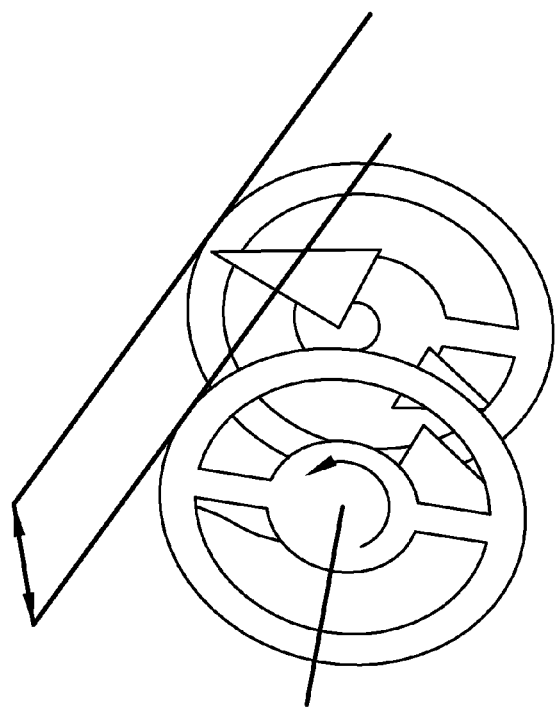
FIGS. 10a-10d illustrate consecutive positions that draw two disjointed connector plates close together.
Figure 10B:
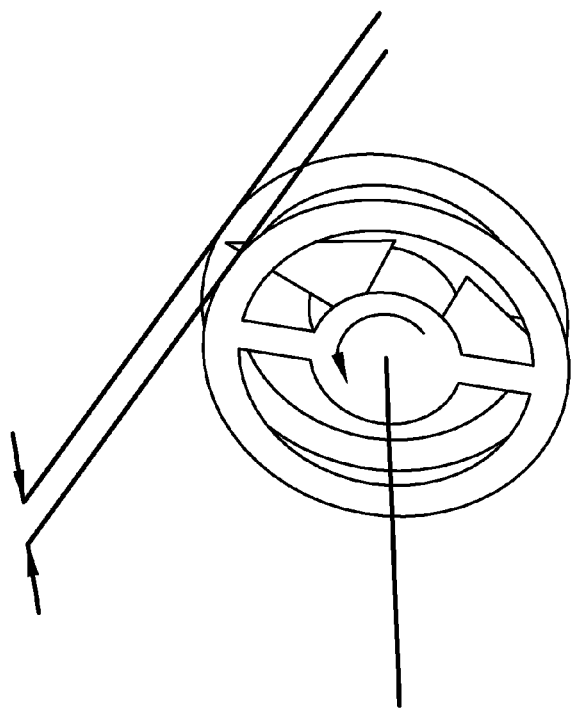
Figure 10C:
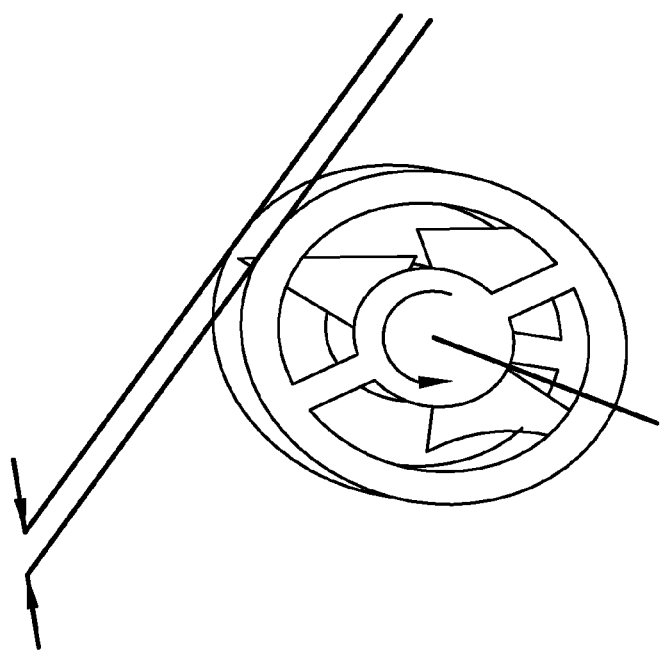
Figure 10D:
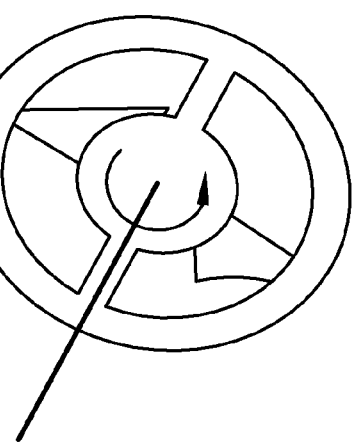

FIGS. 10a-10d illustrate consecutive positions that draw two disjointed connector plates 106 close together. In FIG. 10a, a large axial deviation between one connector plate 106 and the connector plate 106 of a coupling mating module exists. The axial deviation subsequently narrows as the rotating connector plate 106 is drawn close to the stationary connector plate 106, as shown in FIGS. 10b-10c. The process of narrowing the axial deviation may ultimately result in the full concentric alignment of both connector plates 106 once the fully engaged position has been reached, as shown in FIG. 10d. This is an example of the self-centering property of the two connector plates 106. The connector plates 106 may be drawn together by the tapered edges of the connector claws 108. Thus, when the connector claws 108 are run against the mating coupling module's 100 connector claw 108 edges of the section vertical to the connector plate 106, the connector plates 106 may slide and position themselves such that the two connector plates 106 become co-centrical.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language of the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A coupling module for coupling with a mating coupling module to facilitate the joining of two disjoined structures, each attached to one of the coupling modules, without requiring precise alignment between the disjoined structures during the coupling of the structures, the coupling module comprising:

a hollow cylindrical body configured to be rotated about an axis of the cylindrical body, the hollow cylindrical body having at least one internal spiral channel; a drive mechanism operatively connected to the hollow cylindrical body and configured to cause the hollow cylindrical body to rotate about the axis of the cylindrical body;

a substantially circular plate within the hollow cylindrical body, configured to rotate within the hollow cylindrical body, and having at least one detent configured to slidably engage the spiral channel in the hollow cylindrical body during rotation of the substantially circular plate with respect to the hollow cylindrical body such that the substantially circular plate slides longitudinally within the spiral channel while rotating; and a connector claw attached to the substantially circular connector plate and configured to protrude outwardly from the coupling module and to engage a corresponding claw on the mating coupling during rotation of the substantially circular plate when brought in close proximity but not necessarily in precise alignment with the mating coupling module.

2. The coupling module of claim 1 wherein the connector claw is a first connector claw and further comprising a second connector claw attached to the substantially circular connector plate and configured to engage a corresponding claw on the mating coupling module during rotation of the substantially circular plate.

3. The coupling module of claim 2 wherein the first and the second connector claws are attached to opposite sides of the substantially circular plate and face in opposite directions.

4. The coupling module of claim 1 wherein the connector claw includes a tapered edge.

5. The coupling module of claim 1 further comprising a stop mechanism configured to prevent the substantially circular plate from rotating with respect to the hollow cylindrical body.

6. The coupling module of claim 5 wherein the stop mechanism is configured to prevent the substantially circular plate from rotating with respect to the hollow cylindrical body only when the detent engages the internal spiral channel at an end of that channel.

7. The coupling module of claim 5 wherein the stop mechanism includes a sleeve positioned around the axis of the cylindrical body.

8. A coupling module for coupling with a mating coupling module to facilitate the joining of two disjoined structures without requiring precise alignment between the disjoined structures during the coupling of the structures, comprising:

a rotating drive mechanism;

a hollow cylindrical body operatively connected to the rotating drive mechanism, wherein the hollow cylindrical body has at least one internal spiral channel;

at least one connector claw positioned within the hollow cylindrical body and guided by the internal spiral channel, wherein the at least one connector claw is configured to extend outwardly from the coupling module to engage the mating coupling module when brought in close proximity but not necessarily in precise alignment with the mating coupling module;

a primary drive gear, the primary drive gear being configured to rotate along a circular path and driven by the rotating drive mechanism, wherein the primary drive gear is further operatively connected to the hollow cylindrical body so as to rotate with the hollow cylindrical body in unison;

a connector plate, the connector plate being operatively connected to the at least one connector claw and positioned within the hollow cylindrical body, wherein the connector plate is guided by the at least one internal spiral channel;

a base portion with a fixed main shaft so as to provide structural support for the rotating drive mechanism, the primary gear, the hollow cylindrical body, and the connector plate;

a top portion, the top portion encasing the rotating drive mechanism and the primary gear but otherwise exposing the connector plate, wherein the top portion is attached and substantially parallel to the base portion with the fixed main shaft and further comprises an opening for at least one guiding pin; and a center shaft flanged sleeve with at least one external groove so as to prevent the connector plate from turning with the hollow cylindrical body until reaching a maximum protruding range, wherein the center shaft flanged sleeve is attached by a detent mechanism to the base portion with the fixed main shaft.

9. The coupling module of claim 8 wherein the hollow cylindrical body further comprises a plurality of internal spiral channels so as to raise the connector plate to the maximum protruding range.

10. The coupling module of claim 9 further comprising a pin drive gear connected to the hollow cylindrical body by a detent mechanism, wherein the pin drive gear rotates at least one internal lead screw so as to push a respective guiding pin outward.

11. The coupling module of claim 10 wherein the at least one connector claw extends outwardly by rotational motion so as to enter the hollow cylindrical body of the mating module when brought in close proximity but not necessarily in precise alignment to the mating module.

12. The coupling module of claim 11 wherein the at least one connector claw independently retracts inwardly by rotational motion so as to exit the hollow cylindrical body of the mating module.

13. A coupling module for coupling to a mating coupling module to facilitate the joining of two disjoined structures without requiring precise alignment between the disjoined structures during the coupling of the structures, comprising:

a rotating drive mechanism;

a first connector claw operatively connected to the rotating drive mechanism, wherein the first connector claw outwardly extends so as to allow the first connector claw to engage a second connector claw of the mating coupling module and draw the coupling module together with the mating coupling module;

a primary drive gear, the primary drive gear being configured to rotate along a circular path and driven by the rotating drive mechanism;

a hollow cylindrical body, the hollow cylindrical body being operatively connected to the primary drive gear and configured to rotate in unison with the primary drive gear, wherein the hollow cylindrical body further comprises at least one internal spiral channel so as to guide the extension of the first connector claw toward the second connector claw of the mating coupling module;

a first connector plate, the first connector plate being operatively connected to the first connector claw and positioned within the hollow cylindrical body, wherein the first connector plate further comprises a plurality of first connector claws outwardly extending from the first connector plate;

a base portion having a fixed main shaft so as to provide structural support for the rotating drive mechanism, the primary gear, the hollow cylindrical body, and the first connector plate;

a top portion, the top portion being attached to and substantially parallel with the base portion and further comprising an opening for at least one guiding pin; and a center shaft sleeve having a flanged end with at least one external groove so as to prevent the first connector plate from turning with the hollow cylindrical body until reaching a maximum protruding range, wherein the center shaft sleeve is attached by detent mechanism to the base portion.

14. The coupling module of claim 13 wherein the hollow cylindrical body further comprises a plurality of internal spiral channels so as to raise the first connector plate to the maximum protruding range.

15. The coupling module of claim 14 further comprising a pin drive gear connected to the hollow cylindrical body by at least one detent mechanism, wherein the pin drive gear rotates at least one internal lead screw so as to push a guiding pin outward, the guiding pin comprising a spherical end so as to correspond to a guiding hole of the mating coupling module.

16. The coupling module of claim 15 wherein the first connector plate extends outwardly by rotational motion so as to enter the hollow cylindrical body of the mating coupling module when brought in close proximity to the mating coupling module.

17. The coupling module of claim 16 wherein the first connector plate independently retracts inwardly by reverse rotational motion so as to exit the hollow cylindrical body of the mating module.

* * * * *